(12) United States Patent
Wielopolski

(10) Patent No.: US 8,930,700 B2
(45) Date of Patent: Jan. 6, 2015

(54) REMOTE DEVICE SECURE DATA FILE STORAGE SYSTEM AND METHOD

(71) Applicant: Richard J. Wielopolski, Portage, MI (US)

(72) Inventor: Richard J. Wielopolski, Portage, MI (US)

( * ) Notice: Subject to any disclaimer, the term of this patent is extended or adjusted under 35 U.S.C. 154(b) by 0 days.

(21) Appl. No.: 14/041,331

(22) Filed: Sep. 30, 2013

(65) Prior Publication Data

US 2014/0164777 A1 Jun. 12, 2014

Related U.S. Application Data

(60) Provisional application No. 61/736,254, filed on Dec. 12, 2012.

(51) Int. Cl.
*H04L 9/08* (2006.01)
*H04L 9/12* (2006.01)
*H04L 9/32* (2006.01)

(52) U.S. Cl.
CPC ............ *H04L 9/0866* (2013.01); *H04L 9/0872* (2013.01); *H04L 9/0894* (2013.01); *H04L 9/12* (2013.01); *H04L 9/3228* (2013.01)
USPC ............................. 713/171; 713/168; 713/169

(58) Field of Classification Search
USPC ................................................. 713/168–171
See application file for complete search history.

(56) References Cited

U.S. PATENT DOCUMENTS

| 5,341,426 A * | 8/1994 | Barney et al. ................. 713/171 |
| 6,854,059 B2 * | 2/2005 | Gardner ......................... 713/171 |
| 8,296,565 B2 * | 10/2012 | Taylor ............................ 713/169 |
| 8,356,177 B2 * | 1/2013 | McGrew et al. ............... 713/168 |
| 2003/0088769 A1 * | 5/2003 | Quick et al. ................... 713/169 |
| 2004/0003246 A1 * | 1/2004 | Hopkins et al. ............... 713/168 |
| 2004/0073796 A1 * | 4/2004 | Kang et al. .................... 713/171 |
| 2004/0230797 A1 * | 11/2004 | Ofek et al. ..................... 713/168 |
| 2005/0066168 A1 * | 3/2005 | Walmsley ...................... 713/169 |
| 2005/0182934 A1 * | 8/2005 | Elteto ............................ 713/169 |
| 2006/0020794 A1 * | 1/2006 | Oh .................................. 713/168 |
| 2007/0214361 A1 * | 9/2007 | Rubin ............................ 713/168 |
| 2008/0046728 A1 * | 2/2008 | Lyle ............................... 713/169 |
| 2008/0077794 A1 * | 3/2008 | Arnold et al. ................. 713/169 |
| 2008/0270796 A1 * | 10/2008 | Suu et al. ...................... 713/169 |
| 2009/0024848 A1 * | 1/2009 | Takasugi et al. .............. 713/169 |
| 2009/0150672 A1 * | 6/2009 | Kwon et al. ................... 713/169 |
| 2009/0172398 A1 * | 7/2009 | Falk et al. ..................... 713/168 |
| 2009/0287930 A1 * | 11/2009 | Nagaraja ....................... 713/171 |
| 2010/0095123 A1 * | 4/2010 | He ................................. 713/171 |

(Continued)

*Primary Examiner* — Haresh N Patel
(74) *Attorney, Agent, or Firm* — Gardner, Linn, Burkhart & Flory, LLP

(57) ABSTRACT

A remote device secure data file storage system and method of securely storing data files at a remote device, includes a host system having a database and a plurality of remote devices, each connected with the host system by a communication network. Each remote device and the host system is programmed with a time-based cryptography system that generates an encryption key (RVK) and initialization vector (IV) for encrypting and decrypting data on the remote device. The time-based cryptography system generates the encryption key (RVK) as a function of a parameter (PDPT) that is a function of a personal date (PD) and personal time (PT) of the user. The personal date and personal time of the user being a function of personal data entered by the user on the remote device. The personal date (PD) is a function of the date of birth (DOB) of the user and the personal time (PT) is a function of the time of birth (TOB) of the user.

16 Claims, 10 Drawing Sheets

(56) References Cited

U.S. PATENT DOCUMENTS

| | | | |
|---|---|---|---|
| 2011/0066853 A1* | 3/2011 | Engels et al. | 713/168 |
| 2011/0208965 A1* | 8/2011 | Machani | 713/168 |
| 2011/0238989 A1* | 9/2011 | Machani et al. | 713/168 |
| 2012/0144195 A1* | 6/2012 | Nair et al. | 713/168 |
| 2012/0254612 A1* | 10/2012 | Rane et al. | 713/168 |
| 2012/0331293 A1* | 12/2012 | Ma et al. | 713/168 |
| 2012/0331295 A1* | 12/2012 | Tseng et al. | 713/169 |
| 2013/0042112 A1* | 2/2013 | Spector | 713/171 |
| 2013/0054969 A1* | 2/2013 | Charles et al. | 713/169 |
| 2013/0073854 A1* | 3/2013 | Patti et al. | 713/171 |
| 2013/0132723 A1* | 5/2013 | Gaborit et al. | 713/171 |
| 2013/0246789 A1* | 9/2013 | Tzeng et al. | 713/168 |
| 2013/0275755 A1* | 10/2013 | Ignatchenko | 713/168 |
| 2014/0101445 A1* | 4/2014 | Giladi | 713/168 |
| 2014/0164777 A1* | 6/2014 | Wielopolski | 713/171 |
| 2014/0325230 A1* | 10/2014 | Sy et al. | 713/171 |

* cited by examiner

| | |
|---|---|
| NAME | User's stored full first & last NAME |
| USERNAME | USER's stored selected login USER NAME or email address |
| PW | User's stored selected login PassWord |
| DEVNAME | User's stored DEVice pseudo-NAME |
| MOBNUM | User's stored device MOBile phone NUMber |
| MEID | User's stored Mobile Equipment IDentifier device number |
| EULA | PerSysTek End User License Agreement |
| REGCOUNT | Stored COUNT of times the user has REGistered |
| DOB, TOB | User's Date Of Birth and Time Of Birth |
| ADAT | User's stored device Acceptance Date and Acceptance Time |
| PDPT | User's Stored Personal Date and Personal Time |

Fig. 3a

| OFFSET | Functional constant |
| --- | --- |
| RDRT | Registration Date and Registration Time |
| CDCT | Current Date and Current Time |
| RVPC | RecordVault one-time PassCode |
| RVK, RVKOLD | RecordVault Key, prior RVK |
| IV | RecordVault Key Initialization Vector |
| RSA Keys | RSA Public and Private Key pair |
| PRODCODE | RecordVault serial number PRODuct CODE |

Fig. 3b

1. DOBTOB = DOB + TOB with decimal shifting and truncation
2. ADAT = AD + AT with decimal shifting and truncation
3. PDPT = ADAT-DOBTOB
4. REGCOUNT = initial value; incremented with re-registration
5. MPDPT = PDPT; modified with REGCOUNT
6. C1 = OFFSET constant
7. OFFSET=MPDPT/(C1*PDPT)
8. RDRT = (ADAT + DOBTOB)/OFFSET
9. CDCT = CD + CT with decimal shifting and truncation
10. RVPC = CDCT + DOBTOB
11. T1 = Truncation constant
12. RVK = (((ADAT + DOBTOB) + RDRT)/OFFSET)$^n$/T1

Fig. 4

REMOTE DEVICE SECURE DATA FILE STORAGE SYSTEM AND METHOD

CROSS REFERENCE TO RELATED APPLICATION

This application claims priority from U.S. provisional patent application Ser. No. 61/736,254, filed on Dec. 12, 2012, the disclosure of which is hereby incorporated herein by reference in its entirety.

BACKGROUND OF THE INVENTION

The present invention is directed to a cryptographic system and method and, in particular, to a time-based cryptographic technique for generating a cryptographic key that is unique to the user.

The remote device market has grown rapidly, in particular, mobile devices, such as smart phones, tablets, laptops, and other such devices. Many users need and desire to store valuable and potentially life-saving data on their mobile devices in order to have it portable and readily available without relying on data transmission of this information through the internet or other networks. This includes, but is not limited to, healthcare records, financial records, education records and identity records for emergency purposes or for providing information to third parties. These records often contain important, confidential identity and personal information which the user cannot risk exposing to the public.

Security software to protect information on these remote devices is limited and current software techniques typically use a two-factor authentication scheme: something you "have", the device; and something you "know", which is typically a password or personal identification number (PIN). This scheme may be compromised through various techniques including, but not limited to, reverse engineering of the software application, electronic capture or listening of entered passwords and PINS, virus code placed on the device to record and transmit information, brute force software attack to reproduce the password and theft. As a result, many users choose not to store this type of valuable information and carry it with them on a mobile device.

Three-factor authentication is recognized by the industry as providing the maximum amount of user protection, but has typically required some level of hardware biometric capture and is usually, but not limited to, fingerprint, iris, facial, or hand geometry recognition. The hardware techniques are often cost prohibitive and require many physical changes since remote devices, especially mobile phones and tablets, are updated regularly and changed often.

SUMMARY OF THE INVENTION

The present invention provides a low cost software-only three-factor authentication scheme: something you "have", the device; something you "know", a one-time unique code presented to you through the application; something you "are", a date and time known only to the user synchronized to a unique time you activated the application on your device. This software implementation allows users to download a low cost application to their remote device, authenticate momentarily online when requiring use, obtain a secure key, and be able to encrypt and decrypt data on their device. The user is, therefore, assured that the information they carry with them is secure. Once the data is decrypted, the remote device may be disconnected from online services.

The present invention provides a computerized software system and method for generating a cryptographic key unique to every user and their remote device. The system uses an authentication function in which the remote device transmits information to the host system that computes a personal date and a personal time (PDPT) uniquely generated for the user. The personal date and personal time being a function of personal data entered by the user on the remote device. The personal date and personal time are illustrated as based upon the user's date of birth (DOB) and time of birth (TOB), which is synchronized to a unique time established at user registration of the software application instance using this method. Access for obtaining the cryptographic key is controlled by a one-time software code created from the same user date and time of birth with synchronization to the current universal date and time and requires human intervention. The user also creates a valid account with user name and password in advance.

A remote device secure data file storage system and method of securely storing data files at a remote device, according to an aspect of the invention, includes a host system having a database and a plurality of remote devices, each connected with the host system by a communication network. Each remote device and the host system is programmed with a time-based cryptography system that generates an encryption key (RVK) and initialization vector (IV) for encrypting and decrypting data on the remote device. The time-based cryptography system generates the encryption key (RVK) as a function of a parameter (PDPT) that is a function of a personal date (PD) and personal time (PT) of the user. The personal date and personal time of the user being a function of personal data entered by the user on the remote device. The personal date (PD) is a function of the date of birth (DOB) of the user and the personal time (PT) is a function of the time of birth (TOB) of the user. The personal date and personal time may be based upon the user's date of birth (DOB) and time of birth (TOB) that is synchronized to a specific time established at user registration of the software application instance.

The cryptography system may further generate the encryption key as a function of a registration acceptance date (AD) and registration acceptance time (AT) that are a function of when the user registers a device with the host system. The cryptography system may recreate the key (RVK) to decrypt encrypted data by the remote device prompting the user to enter DOB and TOB and generating a parameter (RVPC) that is a function of the entered DOB and TOB and universal current date and time. The host system may also generate RVPC from PDPT and the universal current date and time and compares that value of RVPC with the value of RVPC communicated from the remote device. The remote device may display the generated parameter (RVPC) to the user and requires the user to re-enter RVPC within a particular period of time.

The host system may generate the encryption key (RVK) and transmits the encryption key over the communication network to encrypt data files on the remote device and decrypt data files on that remote device. The parameters DOB and TOB may be calculated from PDPT and ADAT and not stored as a parameter on either the host system or the remote devices. The parameter ADAT may be stored only on the host system and not on the remote device. The encryption key (RVK) may only be generated and not stored on either the host system or the remote device. The host system may transmit the encryption key (RVK) using encryption.

The host system may calculate a parameter (RDRT). The parameter RDRT is a function of DOB and TOB of a user and further being a function of an offset value (OFFSET) and the date and time (ADAT) that said host device accepted registration of that user's remote device. The offset value (OFFSET) may be a function of a number of times (REGCOUNT) that a user attempts to register with the host system. OFFSET, REGCOUNT and other constants are used to obfuscate the stored parameters and prevent reverse engineering of information used in key (RVK) creation.

These and other objects, advantages and features of this invention will become apparent upon review of the following specification in conjunction with the drawings.

BRIEF DESCRIPTION OF THE DRAWINGS

FIG. 3a is a table of definitions of parameters used in the illustrated embodiment;

FIG. 3b is a continuation of the table in FIG. 3a;

FIG. 4 is a list of mathematical relationships among the parameters in FIGS. 3a and 3b;

DESCRIPTION OF THE PREFERRED EMBODIMENT

Figure 1:
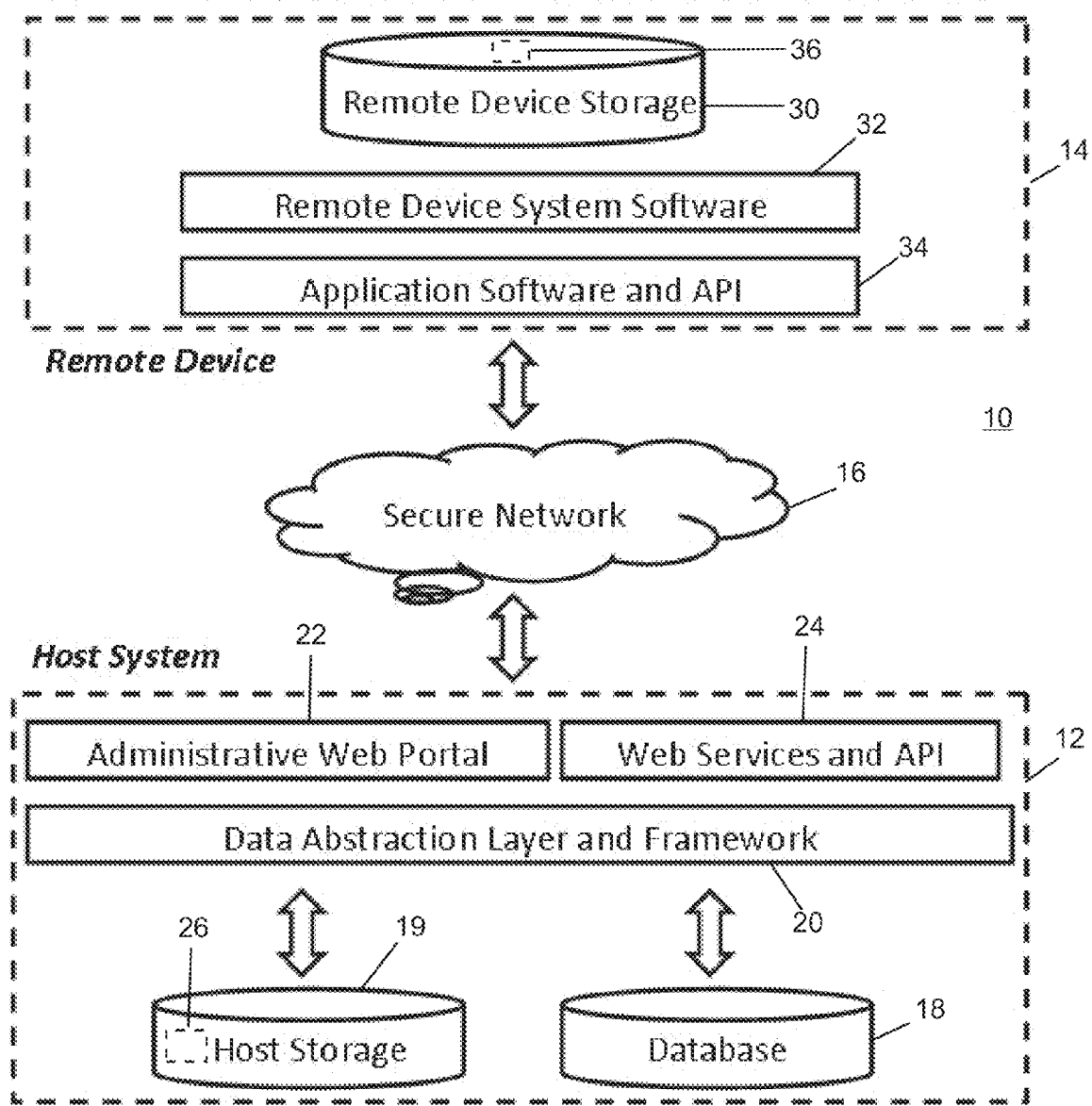
FIG. 1 is a block diagram of a remote device secure file storage system according to an embodiment of the invention.
Figure 2A:
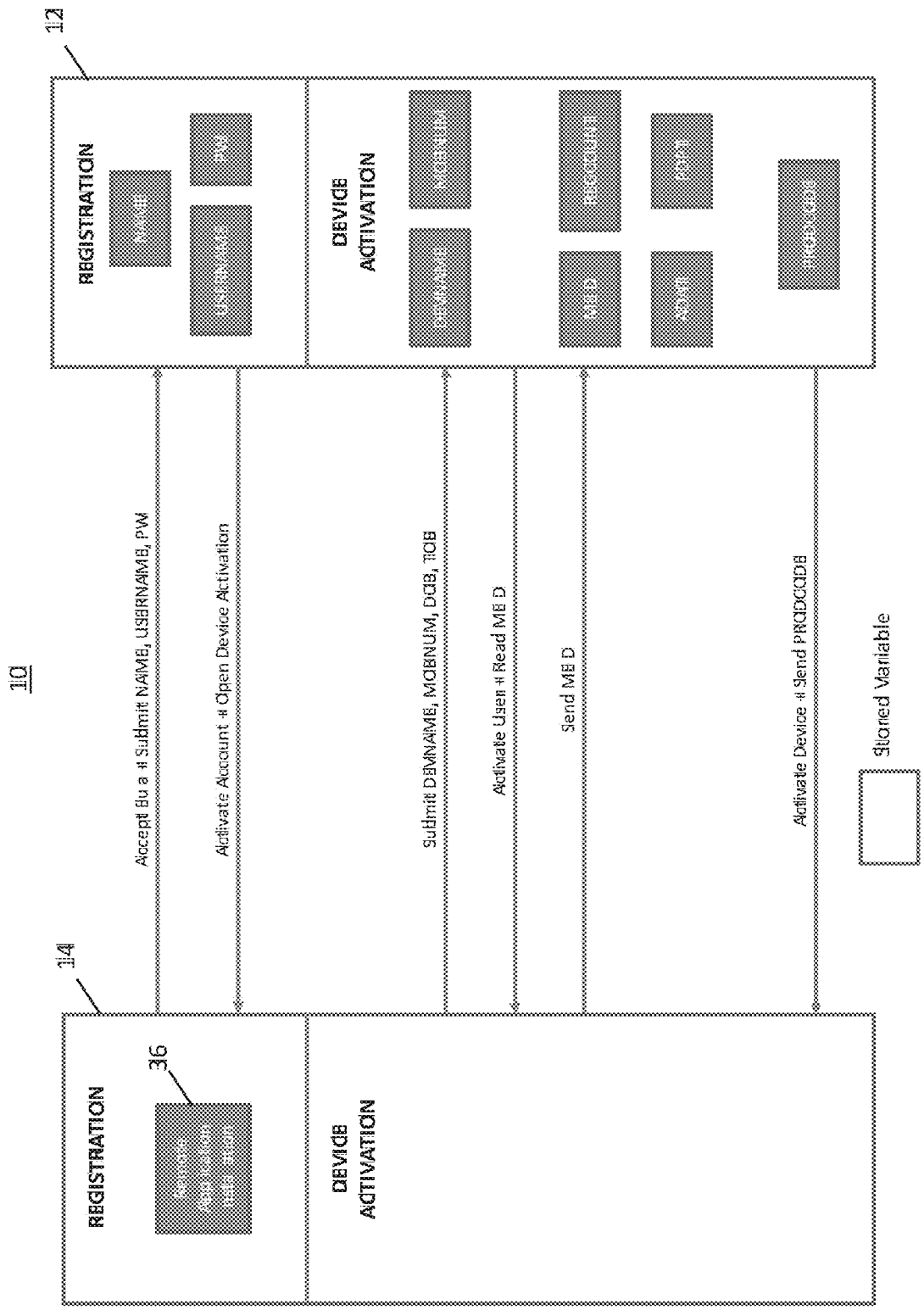
FIG. 2a is a block diagram of a host system and a representative remote device illustrating flow of data between the host system and the remote device and the parameters that are stored on each during registration of the remote device.
Figure 2B:
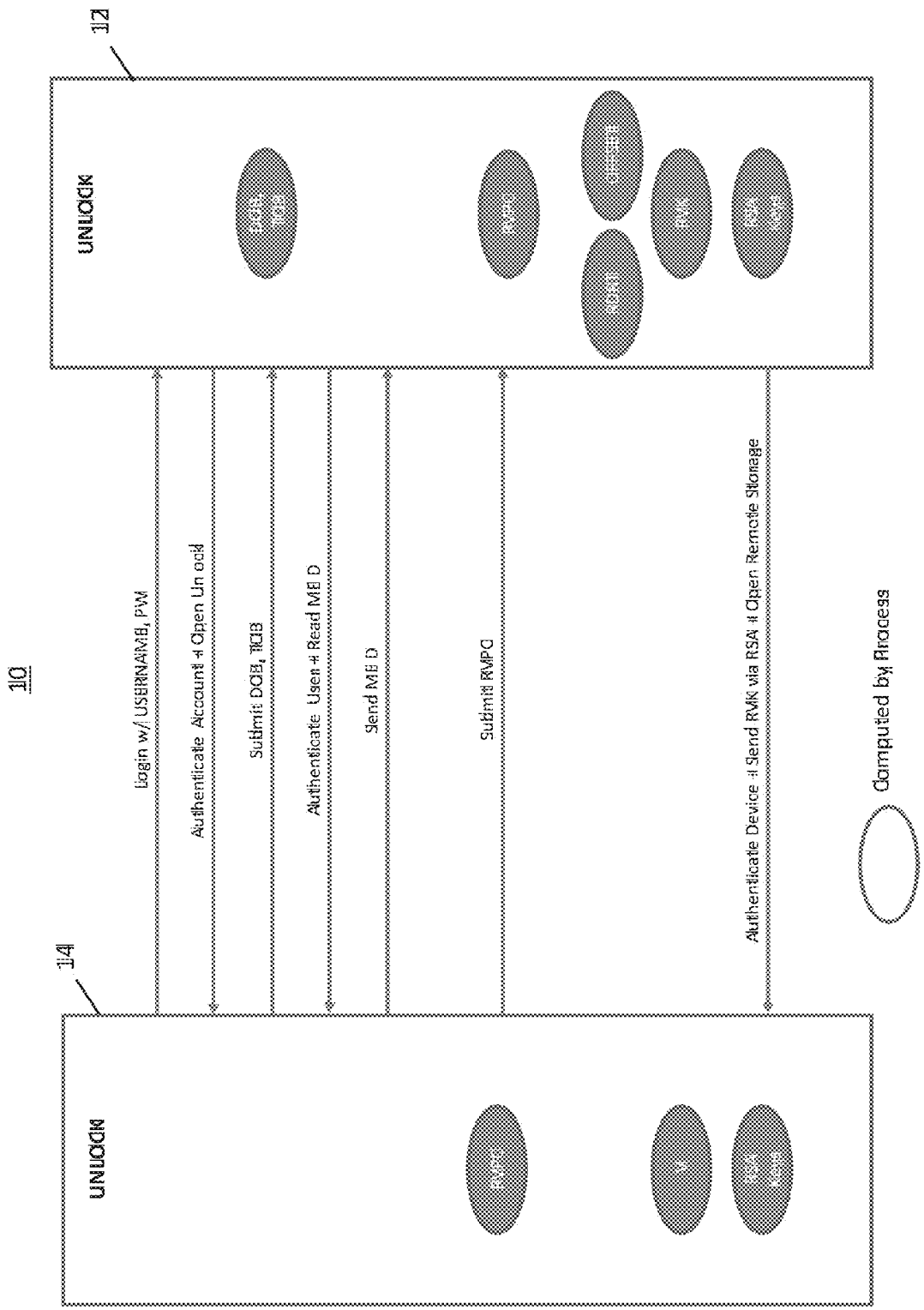
FIG. 2b is a block diagram of the host system and a remote device during generation of an encryption key to decrypt encrypted data on the remote device illustrating flow of data between the host system and the remote device showing parameters calculated to generate the encryption key.
Figure 2C:
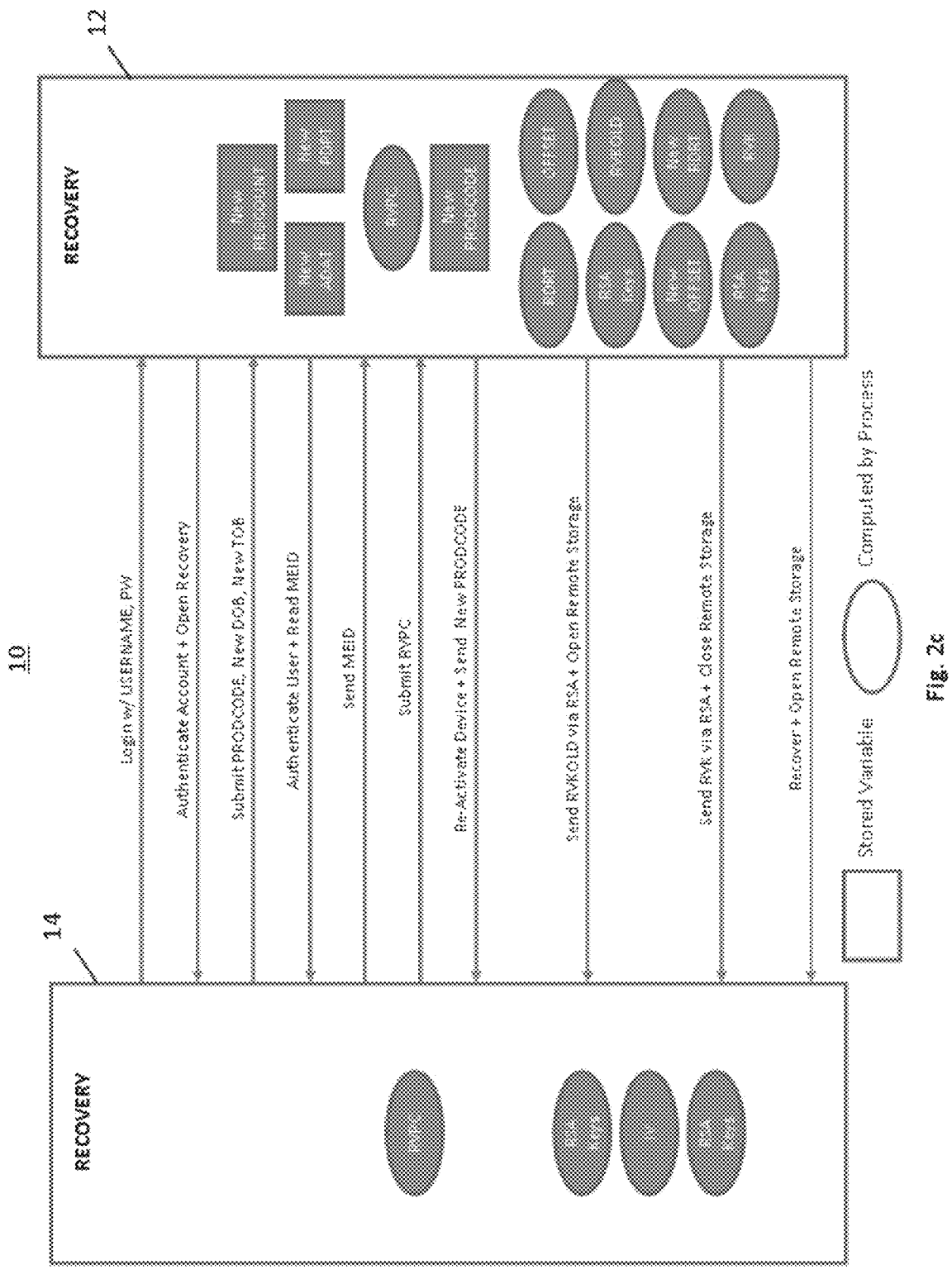
FIG. 2c is a block diagram of the host system and a remote device during recovery from incorrect entry of personal data or other credentials illustrating flow of data between the host system and the remote device and showing stored parameters and calculated parameters on the host system and remote device.
Figure 2D:
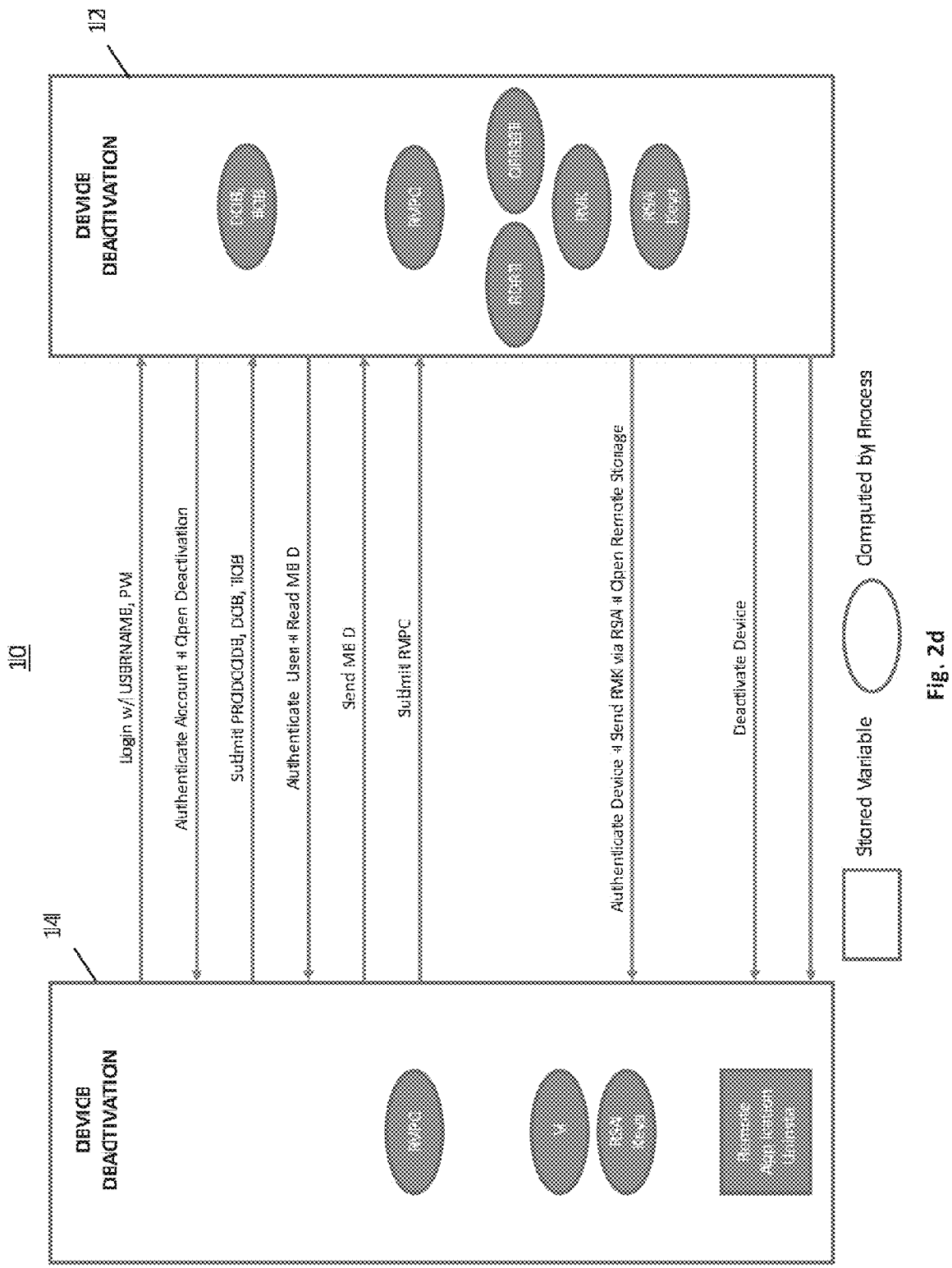
FIG. 2d is a block diagram of the host system and a remote device during deactivation of the encryption scheme illustrating flow of data between the host system and the remote device.

Referring now to the drawings and the illustrative embodiments depicted therein, a remote device secure data file storage system 10 includes a host system 12 and a plurality of remote devices 14, of which only one is shown, in communication over a communication network 16 (FIG. 1). Host system 12 and remote device 14 run a program 26 that secures data stored on remote device 14 against access by unauthorized users. Program 26 includes a user authentication function that identifies an authorized user that is requesting access to the secured data and thereby allows access to the secured data on remote device 14 to the authorized user. This is accomplished by program 26 generating and transmitting an encryption key (RVK) to remote device 14 to encrypt data on the remote device and recreating the same encryption key and transmitting the encryption key to the remote device when the user authentication function identifies that the authentic user is requesting access to the secured data. Acronyms, such as RVK, are used throughout this document to illustrate the relationship among various stored and calculated data. Such acronyms, which are defined in FIGS. 3a and 3b, are used to enhance the disclosure herein and are not intended to be limiting. FIG. 4 illustrates mathematical relationships among the various data represented by the acronyms.

Host system 12 may be any server that can host web services and includes a relational database 18. Host system 12 includes an administrative web portal 22 for maintaining and monitoring the host system (12). In the illustrated embodiment, critical data is stored on database 18 using conventional hashing or encryption techniques. This t allows other data to be compared with the hashed data to determine if the data match but does not otherwise allow the hashed data to be accessed, or for data to be temporarily decrypted for use by program 26. Host system 12 includes a data abstraction layer and framework module 20 that manages flow of data to and from database 18 and host storage 19. Data abstraction layer and framework module 20 also manages flow of data to and from a web service and application program interface (API) 24 that manages services including access to data elements stored on database 18. Host web services are a set of computer application programs that are called by remote device 14 for authentication of accounts, users and devices; remote device registration and recovery management; remote device activation and deactivation management; product code creation and management; and time synchronization. Host system web services 24 further creates and manages encryption keys RVK. Host system API 24 includes a set of computer application programs that establish specific protocol and commands for communication to and from remote devices 14. Host system API 24 also creates and manages a conventional cryptographic method used for secure transmission of encryption key RVK between host system 12 and remote devices 14. In the illustrated embodiment, a conventional cryptographic method is used for secure transmission of the key, such as the RSA cryptographic method. Such RSA cryptographic method is established to be secure and is widely used.

Remote device 14 is illustrated as a mobile device, such as a smart phone, tablet, laptop, or other such device. Remote device 14 can be any computer-based device having a computer-operating system and storage capability 30. Remote device 14 may be a storage-only device, such as a flash drive or other type of storage media, which is capable of being connected with a computer-operating system. Remote device 14 includes remote device system software 32 that is software used by the remote device to manage its own storage 30. Software 32 and remote device storage 30 can be permanently in the remote device or removable storage, such as a memory card, or the like. In the illustrated embodiment, remote device 14 further includes a downloadable application program 36 and an application software and application program interface (API) 34. Application software and API 34 is a remote portion of program 26 and web services and API 24 and is used to present information, collect inputs, provide authentication function and manage the encryption and decryption of data in remote device 14.

Communication network 16 provides secure communication between host system 12 and each remote device 14 and may be a conventional cellular, wireless network (WIFI) containing conventional communication security for transmission of data between host system 12 and each remote device 14.

Referring to FIGS. 2a-2d, secure data storage system 10 is illustrated with variables and processes for host system 12 that are employed to authenticate accounts, users and devices in order to establish a temporary communication link to and from host system 12 and remote device 14 for the purposes of generating and securely communicating a unique encryption key (RVK) to remote device 14 for encrypting and decrypting data in the remote device. Square or rectangular boxes in the drawing indicate stored variables and circles or ovals indicate processes that run by computer program. The processes which generate specific, non-stored, data used in this method prevent intruders from obtaining critical data elements of the encryption key even if the intruder gains access to the host system. The process results are only temporarily resident in host system volatile memory while the process is running. The process results are then cleared.

Industry standard login and logout procedures are invoked by secure data storage system 10 including change password, forgot password and reset password; create account, update account and cancel account; login failure attempts with security; and logout time out. These procedures are for prevention of repeated intruder attempts and are required before and during operation of the method. Because these are well known procedures, they will not be described in detail herein.

Functions

Remote device secure data storage system 10 is capable of performing various functions including (i) registration of the remote device; (ii) remote device activation; (iii) remote device unlock, or data encryption and decryption; (iv) recovery; and (v) device deactivation. These functions will be described in reference to the acronyms defined in FIGS. 3a and 3b and related to each other as described in FIG. 4.

I. Registration

Registration (FIG. 2a) is a function that begins by remote device 14 downloading and installing an application 36 that will be invoked every time the user wants to access encrypted data stored by the remote device. No variables or keys are ever stored in remote device 14. Registration requests the user to submit their full name (NAME), e-mail address (USERNAME) and password (PW) through the remote device. Host system 12 stores a hashed or encrypted version of these variables for each account for use in authentication each time the user logs in to obtain the encryption key RVK. Application 36 also displays "In Case of Emergency" (ICE) information stored by application 36. The ICE information is not encrypted and is accessible via a prominent menu selection in the application.

II. Activation

Device Activation (FIG. 2a) requires the user to submit their mobile phone number (MOBNUM), if it exists, as well as personal data in the form of their date of birth (DOB), time of birth (TOB) selected by the user and an optional device name (DEVNAME). Host system 12 stores an encrypted version of MOBNUM, but never stores the DOB or TOB. The DOB and TOB are used in algorithms resident only in host system 12 for authentication of the user and for producing a unique software code and encryption key RVK used for unlocking the remote device encrypted storage data. Since DOB and TOB are not stored in the remote device, there is no opportunity for intruders to steal this data electronically or otherwise.

Host system 12 will also communicate with remote device 14 to obtain the Mobile Equipment Identifier (MEID), if it exists. MEID is not used as part of generating the encryption key. Host system 12 stores a hashed version of MEID to properly identify the remote device that is requesting authentication. Host system 12 stores the number of times the user has registered an account (REGCOUNT) and uses it in the encryption key generation process. Host system 12 also stores an encrypted version of the acceptance date and time (ADAT). ADAT is the unique time at which the user registered their remote device. This is used to algorithmically compute a personal date and time (PDPT) for the user. PDPT is stored in an encrypted format, and subsequently used to compute DOB and TOB for comparison to each submission during the unlock process. ADAT is not stored in remote device 14 and if a user's DOB and TOB were viewed in some way during submission, the use of that same DOB and TOB on another device or account will not authenticate.

Upon completion of these tasks, host system 12 will generate a unique, random product code (PRODCODE) as a serial number for the application in a particular remote device 14, store an encrypted version of PRODCODE, and send it to the user for them to record offline as proof of ownership. The PRODCODE is never stored by the application in the remote device.

III. Unlock

All data securely stored by application 36 in the encrypted state on storage 30 of remote device 14 is not interpretable by another application without the encryption key. Unlock (FIG. 2b) is the procedure invoked every time the user wants to generate an encryption key (RVK) to either encrypt data or to access encrypted data stored by application 36. In Case of Emergency (ICE) information is stored by application 36 in non-encrypted form and can be accessed without performing the unlock function. The ICE information is accessible via a prominent menu selection in the application.

After successful authentication of the account and submission of user credentials, that is, date of birth (DOB) and time of birth (TOB); the mobile equipment identification (MEID) is read by host system 12 to ensure that the same remote device is requesting the encryption key. This fulfills the first factor of authentication; something you "have", namely, you have the registered device.

A one-time software code (RVPC) is then generated by remote device 14. The user must re-enter RVPC, which is submitted to host system 12. The host system 12 also independently generates the one-time software code (RVPC) and compares the result with the user submission of RVPC from the remote device. The temporary one-time software code RVPC is dependent upon the current, real-time, coordinated universal date and time (CDCT), is limited in duration to prevent hacking, and fulfills the second factor of authentication; something you "know". The user knows the software code RVPC because it is generated and temporarily displayed by that remote device.

After confirming that the submission satisfies the first two factors of authentication, host system 12 computes the actual DOB and TOB based upon the ADAT, which only the host system knows. The host system compares DOB and TOB that it calculates in this fashion to the values of DOB and TOB from the current user submission for final authentication. This fulfills the third factor of authentication; something you "are".

Once authentication of the account, device and user are complete, host system 12 will generate the encryption key (RVK) that is unique to that user to be sent to the user each time they request it. This will be the same value of RVK that is used to encrypt the data on that remote device and decrypt the data. The value of RVK is never stored in host system 12 or remote system 14. The algorithms used to calculate RVK utilize various levels of SALT introduced into the computations, an industry practice known to the skilled artisan, and obfuscation of mathematical processes. This prevents reverse engineering the process if an intruder somehow gained access to the host system. These techniques also prevent dictionary attacks, rainbow table attacks and brute-force attacks, all known in the art.

The generated encryption key (RVK) is sent only once via RSA cryptography transmission to the remote device. Upon receipt, the remote device application 36 will use the key and a randomly generated initialization vector (IV) to decrypt data that has been encrypted by this application. Initialization vector (IV) is generated in the user's device to prevent multi-attempt hacking. The user does not see or need to ever enter the RVK. The application automatically applies the RVK and the initialization vector (IV) to encrypt and decrypt data using the AES-256 bit encryption process in the application.

Security is maintained throughout the communication since all data is sent via secure transmission, only the real user will have the correct device, the correct one-time software code at the moment in time established by the host system, and the correct DOB and TOB. The generated encryption key (RVK) is sent once via RSA cryptography to prevent electronic capture over the network.

Host system 12 generates encryption/decryption key RVK using a time-based cryptographic system and method. The unique time element is the user's date and time of birth (DOB and TOB) synchronized with the time the user registered the application for use (ADAT). This combination, and a synchronization of a one-time software code (RVPC), guarantees that no two users will ever have the same identifying credentials. This information is used to generate a unique encryption key (RVK). The storage of variables only in host system 12 and lack of storage variables in the remote system 14 also prevents hackers from obtaining valuable information to recreate the encryption key.

Processes used to create key RVK require both host system 12 and remote device 14 plus human intervention in order to authenticate and begin the key generation process. The transmission of the encryption key from the host system to the remote device is via industry standard, non-repeating, asynchronous RSA key pair using greater than 2048 bits, PKCS#1, block 02 padding and modulus of 512 that is proven to be secure and the preferred method of secure communication of encryption keys. The key RVK received at the remote device may be used to encrypt and decrypt electronic digital data, text, voice, images, files, folders, disks or other digital containers.

Key RVK is used in an industry standard, synchronous AES-256 bit encryption in CBC mode with PKCS5 padding and a variable initialization vector for the encryption and decryption of data. These methods provide the highest level of data protection, are proven to be secure and use Federal Information Processing Standard (FIPS) 140 approved cryptographic algorithms, modules and libraries.

The functions below indicate the elements used to produce a result that when combined with other functions, and synchronized with coordinated universal time, will generate a unique encryption key for each user and their devices. All processes, except the one-time software code RVPC, are generated or stored in the host system. The RVPC code is generated in the host system and the remote device, but never stored. The mathematical operations used in the key generation functions can be any repeatable mathematical process that generates exactly the same result within the resolution of the key length and provides entropy equal to or greater than the security strength of the encryption algorithm for that key size.

Date and time of birth (DOBTOB) is the result of a mathematical combination of a user's submission of their date of birth (DOB) and time of birth (TOB) as selected by the user. It is always generated and not stored as a variable. Acceptance date and time (ADAT) is the result of a mathematical combination of the acceptance date (AD) and acceptance time (AT) at the time of registration and device activation. It is stored as an encrypted variable. Personal date and time (PDPT) is the result of a mathematical operation and is a function of ADAT and DOBTOB. It is stored as an encrypted variable. A value REGCOUNT is a constant derived from the number of times a user has registered a device.

Modified personal date and time (MPDPT) is the result of a mathematical operation and is a function of PDPT and REGCOUNT. It is always generated and not stored as a variable. C1 is a constant used in the creation of an offset variable (OFFSET). It may or may not be generated or stored. It may or may not be stored as a hashed or encrypted variable. OFFSET is the result of a mathematical operation and is a function of MPDPT, C1 and PDPT. It is always generated and not stored as a variable.

Registration date and time is the result of a mathematical operation and is a function of ADAT, DOBTOB and the OFFSET. It is always generated and not stored as a variable. Current date and time (CDCT) is the result of a mathematical combination of the current date (CD) and current time (CT) synchronized with coordinated universal date and time. It is always generated and not stored as a variable. The one-time software code (RVPC) is the result of a mathematical operation and is a function of CDCT and DOBTOB. It is always generated and not stored as a variable.

T1 is a constant used to ensure that mathematical results are truncated to produce repeatable results of the correct key length. It may or may not be generated or stored as a hashed or encrypted variable. The encryption key (RVK) is the result of a mathematical operation and is a function of ADAT, DOBTOB, RDRT, OFFSET and T1. It is always generated and not stored as a variable.

IV. Recovery

Recovery (FIG. 2c) is a special case where a user has submitted their credentials (DOB and TOB) incorrectly multiple times or has forgotten the credentials and requires assistance. A recovery operation is invoked. After account authentication, a similar procedure as Unlock is used except the user must submit the product code (PRODCODE) issued to them during device activation. Successful comparison of the MEID and the PRODCODE by the host system will require the user to re-enter their DOB and TOB. The recovery process will be launched.

As a part of the recovery process, a hashed or encrypted version of a new set of variables is stored in host system 12 and associated with the account, user and device. This includes a new registration count (REGCOUNT), new acceptance data and time (ADAT) and a new personal date and time (PDPT). The user will be required to enter the generated one-time software code (RVPC), and, after verification, a new, unique, random PRODCODE is generated and sent to the user for offline record keeping.

The Host System will then generate and send the prior encryption key (RVKOLD) via RSA cryptography to remote device 14, which generates an initialization vector (IV), for decryption of all data stored by the application, except ICE files. Confirmation of completion by the remote device triggers the host system to generate and send a new encryption key (RVK) to the remote device via RSA cryptography, which generates an initialization vector (IV), to encrypt all of the data stored by the application except ICE files. The user has now completed the recovery process and can use the application in the normal manner.

V. Device Deactivation

A user may select to deactivate a remote device (FIG. 2d), such as when owning and using the application on more than one device. After account authentication, the user must submit the product code (PRODCODE) issued to them during activation of that remote device. After successful authentication of the user and device by correct submission of date of birth (DOB) and time of birth (TOB); mobile equipment identification (MEID) and one-time software code (RVPC), host system 12 will generate and send the encryption key (RVK) via RSA cryptography to the Remote Embodiment, which generates an initialization vector (IV), to decrypt all of the data stored by application 36. Confirmation of completion by the remote device triggers the host system to deactivate the device thus terminating application 36 for that device.

Processes

Figure 5:
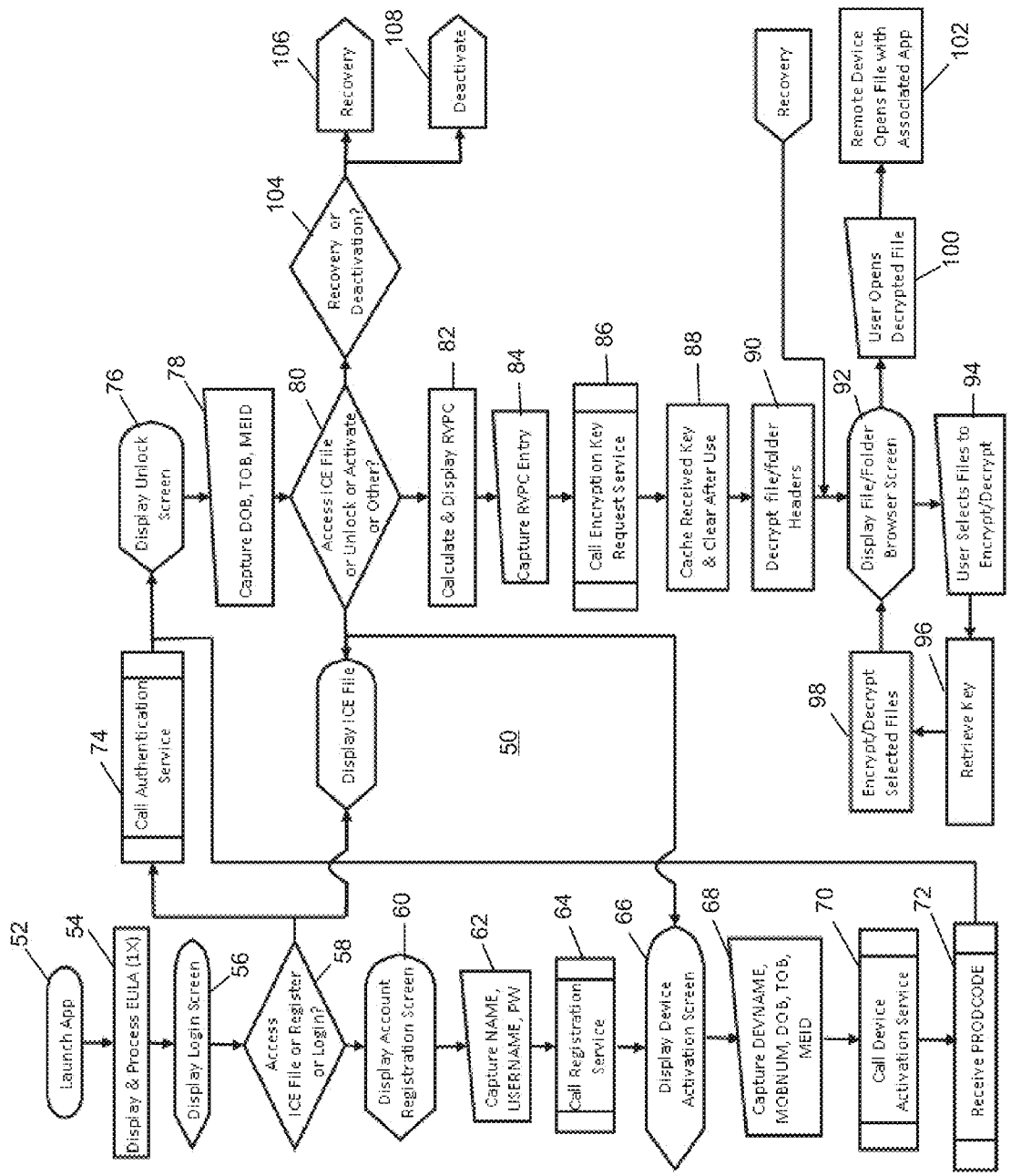
FIG. 5 is a flow diagram of registration and unlock processes.
Figures 6, 7:
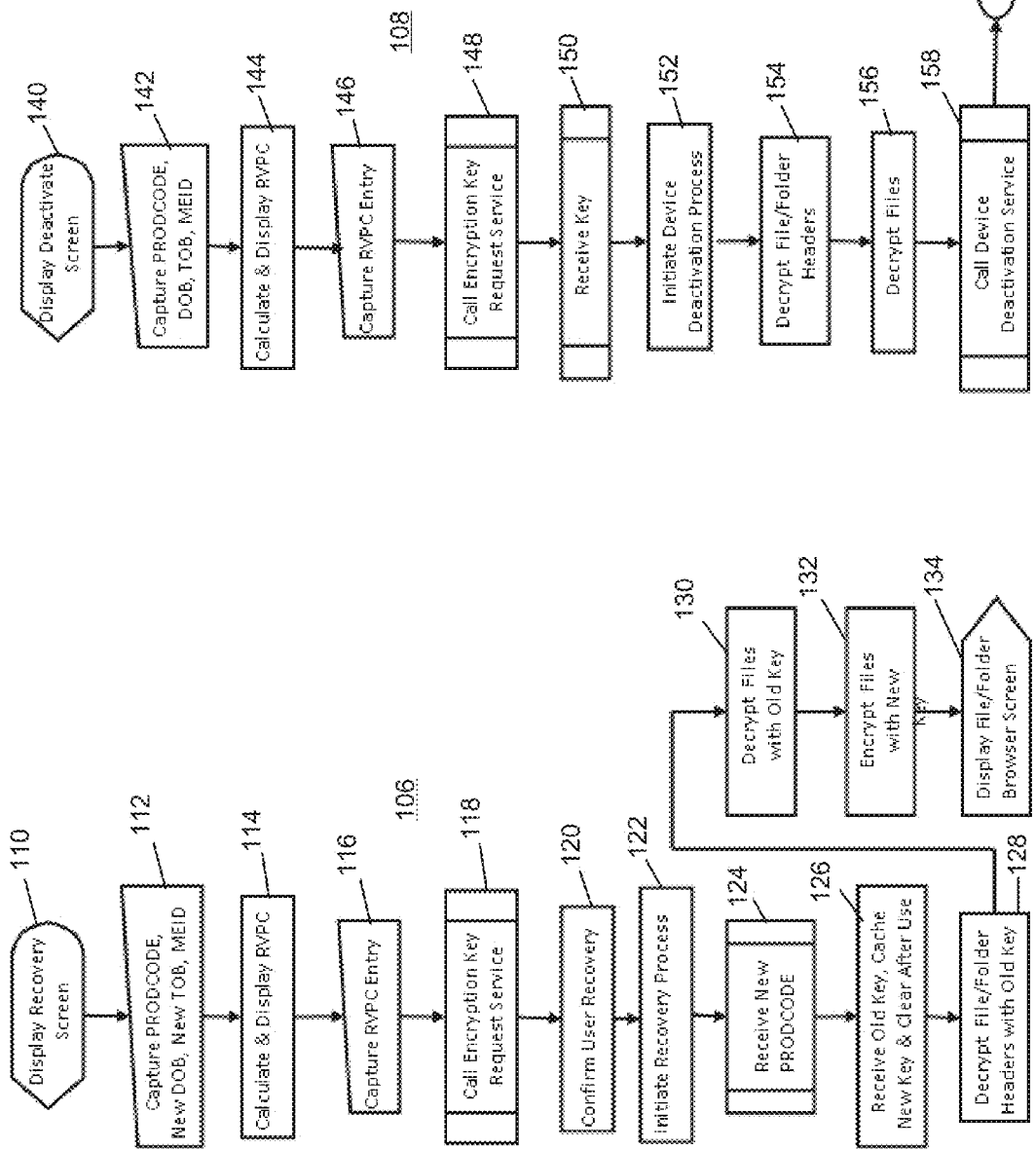
FIG. 6 is a flow diagram of a recovery process.
FIG. 7 is a flow diagram of a deactivation process.

The process flow diagram, illustrated in FIGS. 5-7, describes processes of host system 12 and remote units 14 that are called to generate the above-described results and process information. The processes include a registration and unlock process 50 (FIG. 5), a recovery process 106 (FIG. 6) and a device deactivation process 108 (FIG. 7). Together, these flows represent the user experience and host service calls required to securely generate and transmit a unique encryption key to the remote device.

Registration and unlock process 50 begins with a user launching (52) the application 36 in their remote device after download, installation and acceptance of an End User License Agreement (EULA) that is displayed (54) only on initial launch. Registration is the path for initial use of the application. A login Screen is presented (56) for user submission of user name (USERNAME) and password (PW) or selection to go directly to the In Case of Emergency (ICE) non-encrypted file or to register an account and activate a device. After registration, a subsequent Login request (58) calls a host system authentication service (74) and successful login results in presentation of an unlock screen (76).

An account registration Screen is presented (60) for new user submission of the user's full name (NAME), USERNAME and password (PW) (62) and a call is made to a host system registration service (64) to create the account in its database. A device activation screen is then presented (66) for user submission of a pseudo device name (DEVNAME), date of birth (DOB) and time of birth (TOB) at 68. A call is then made (70) to a host system device activation service to store the appropriate variables, read the mobile equipment identifier (MEID), if it exists, and to activate the device in its database. Upon successful completion, the Host System will send a unique product code (PRODCODE) at 72 to be used as a serial number and proof of ownership.

Device activation 66 will be presented any time the user selects activating another device, or is routed to this flow by trying to use the same DOB and TOB on a non-activated device. Device activation 66 ensures that unique encryption keys are generated for each remote device 14.

Completion of registration and device activation presents the unlock screen at 76 for user submission of DOB and TOB (78). If the user attempts to access ICE files or unlock encrypted files or activate other remote devices, it is determined at 80 that the user is not attempting (104) to recover credentials (106) or perform device deactivation (108). If it is determined at 80 that the user is not attempting to display the ICE file, the remote device will compute a one-time software code (RVPC) at 82 and require the user to re-enter and submit it (84) within a specific period of time. The submission calls the host system encryption key service (86) which reads the MEID, authenticates the user, authenticates the remote device, processes all of the variables, generates the encryption key (RVK) at 88 and securely sends the encryption key to the remote device, which generates an initialization vector (IV), to decrypt files and folders (90).

The remote device presents a file and folder browser screen (92) that decrypts any folder and file headers necessary and depicts which files are encrypted and which are decrypted. The user can further encrypt or decrypt any file through selections on the screen, add or move files by dragging them electronically into the encryption folder, and delete files by selection (94). Selecting a file by clicking its name opens the decrypted file with the Remote Embodiment application associated with the file type. All encrypted files and their headers remain in that state when the application is closed. These operations use the encryption key received (96) from host system 12 and resident in real time volatile memory until the application is closed or the key duration time runs out to encrypt or decrypt the selected files (98, 100, 102). Remote device offline clean-up tasks can be invoked by the user to eliminate any remnants of files decrypted during browsing.

If the recovery process (106) is selected or necessary, the user is presented with a recovery screen (110) for submission of their product code (PRODCODE), a new DOB and new TOB (112). The Remote Embodiment will compute and display (114) a one-time software code (RVPC) and require the user to re-enter and submit it within a specific period of time (116). The remote device then calls (118) the host system encryption key request service which reads the MEID, authenticates the user, authenticates the device, processes all of the variables, and confirms recovery (120). The process then initiates the recovery process at 122 and sends a new PRODCODE to the user (124). The Host System generates the prior encryption key (RVKOLD) as well as the new RVK at 126 and securely sends the encryption keys to the remote device. The remote device then decrypts all file and folder headers with the prior key (128), decrypts all files with the prior key (130) and encrypts all files, folders and headers with the new key (132) after applying the respective initialization vectors (IV). The remote device then presents the File and Folder Browser Screen upon completion (134).

If the device deactivation process (108) is selected or necessary, the user is presented with a deactivation screen (140) for submission of their product code (PRODCODE), a DOB and TOB (142). The remote device will compute a one-time software code (RVPC) at 144 and require the user to re-enter and submit it within a specific period of time (146). The remote device then calls the host system encryption key request service (148) which reads the MEID, authenticates the user, authenticates the device, processes all of the variables, generates the encryption key (RVK) at 150 and initiates the device deactivation process (152). The remote device generates an initialization vector (IV) and decrypts all file and folder headers with the key (154), decrypts all files with the key (156) and calls the host system device deactivation service (158) which deactivates the device information and terminates the remote device application 36 (160).

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A remote device secure data file storage system, comprising:

a host system, said host system comprising a database;

a plurality of remote devices, each connected with said host system by a communication network;

each said remote device and said host system programmed with a time-based cryptography system that generates an encryption key (RVK) and initialization vector (IV) for encrypting and decrypting data on the remote device;

said time-based cryptography system generating the encryption key (RVK) as a function of a parameter (PDPT) that is a function of a personal date (PD) and personal time (PT) of the user, the personal date and personal time of the user being a function of personal data entered by the user on the remote device, wherein the personal date (PD) is a function of the date of birth (DOB) of the user and the personal time (PT) is a function of the time of birth (TOB) of the user.

2. The system as claimed in claim 1 wherein the cryptography system generates the encryption key further as a function of a registration acceptance date (AD) and registration acceptance time (AT) that are a function of when the user registers a remote device with the host system.

3. The system as claimed in claim 2 wherein the key (RVK) and initialization vector (IV) are recreated to decrypt encrypted data by the remote device prompting the user to enter DOB and TOB and generating a parameter (RVPC) that is a function of the entered DOB and TOB and universal current date and time.

4. The system as claimed in claim 3 wherein the host system also generates RVPC from PDPT and the universal current date and time and compares that value of RVPC with the value of RVPC communicated from the remote device.

5. The system as claimed in claim 4 wherein the remote device displays the generated parameter (RVPC) to the user and requires the user to re-enter RVPC within a particular period of time.

6. The system as claimed in claim 3 wherein the remote device displays the generated parameter (RVPC) to the user and requires the user to re-enter RVPC within a particular period of time.

7. The system as claimed in claim 3 wherein said host system generates the encryption key (RVK) and transmits the encryption key over said communication network to the remote device.

8. The system as claimed in claim 2 wherein ADAT is not stored on the remote device.

9. The system as claimed in claim 2 wherein said host system computes a parameter (RDRT), said parameter RDRT being a function of DOB and TOB of a user and further being a function of an offset value (OFFSET) and the date and time (ADAT) that said host device accepted registration of that user's remote device.

10. The system as claimed in claim 9 wherein the offset value is a function of a number of times (REGCOUNT) that a user attempts to register with the host system.

11. The system as claimed in claim 1 wherein said host system generates the encryption key (RVK) and transmits the encryption key over said communication network to the remote device.

12. The system as claimed in claim 11 wherein the remote device generates the initialization vector and applies RVK and IV to encrypt data files on the remote device and decrypt data files on that remote device.

13. The system as claimed in claim 1 wherein DOB and TOB are not stored as a parameter on either said host system or said remote device.

14. The system as claimed in claim 1 wherein RVK is not stored on either said host system or the remote device.

15. The system as claimed in claim 7 wherein the remote device generates the initialization vector and applies RVK and IV to encrypt data files on the remote device and decrypt data files on that remote device.

16. A method of securely storing data files at a remote device in a system made up of a host system having a database and a plurality of remote devices, each connected with said host system by a communication network; said method comprising:

generating an encryption key (RVK) and initialization vector (IV) for encrypting and decrypting data on the remote device with a time-based cryptography system;

said time-based cryptography system generating the encryption key (RVK) as a function of a parameter that is a function of a personal date (PD) and personal time (PT) of the user, the personal date and personal time of the user being a function of personal data entered by the user on the remote device, wherein the personal data (PD) is a function of the date of birth (DOB) of the user and the personal time (PT) is a function of the time of birth (TOB) of the user.

* * * * *